(12) United States Patent
Mackie (10) Patent No.: US 10,450,836 B2
(45) Date of Patent: Oct. 22, 2019

(54) ANNULUS ACCESS VALVE

(71) Applicant: Halliburton Energy Services, Inc., Houston, TX (US)

(72) Inventor: Darryl Kenneth Mackie, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 15/737,224

(22) PCT Filed: Jul. 31, 2015

(86) PCT No.: PCT/US2015/043220
§ 371 (c)(1),
(2) Date: Dec. 15, 2017

(87) PCT Pub. No.: WO2017/023264
PCT Pub. Date: Feb. 9, 2017

(65) Prior Publication Data
US 2018/0355697 A1    Dec. 13, 2018

(51) Int. Cl.
*E21B 34/10* (2006.01)
*F16K 31/122* (2006.01)
(Continued)

(52) U.S. Cl.
CPC ............ *E21B 34/102* (2013.01); *E21B 34/04* (2013.01); *E21B 34/10* (2013.01); *E21B 34/16* (2013.01); *F16K 3/24* (2013.01); *F16K 31/1221* (2013.01)

(58) Field of Classification Search
CPC ...... E21B 33/12; E21B 33/127; E21B 33/129; E21B 34/102; E21B 34/104; E21B 34/10; E21B 34/16
See application file for complete search history.

(56) References Cited

U.S. PATENT DOCUMENTS 2,786,535 A * 3/1957 Boer ................. E21B 21/10
166/142
3,941,190 A * 3/1976 Conover ............ E21B 21/10
166/187
(Continued)

FOREIGN PATENT DOCUMENTS

WO     9922112      5/1999
WO     2013130096   9/2013

OTHER PUBLICATIONS

International Search Report and Written Opinion of PCT Application No. PCT/US2015/043220 dated Mar. 31, 2016: pp. 1-17.

*Primary Examiner* — Matthew R Buck
*Assistant Examiner* — Aaron L Lembo
(74) *Attorney, Agent, or Firm* — Chamberlain Hrdlicka (57) ABSTRACT

A valve includes a chamber within a housing. A sliding member is located within the chamber and configured to move within the chamber. The sliding member includes a lower portion and an upper portion wherein the upper portion includes a passage. A spring device couples the sliding member to one end of the chamber. An inner passage of the housing is coupled between the chamber and an inner passage outlet of the housing. A control fluid inner passage is coupled between the chamber and a control fluid port of the housing. The inner passage is coupled to a gap area adjacent to a top surface of the sliding member. In a closed position, the lower portion of the sliding member is between an outer housing hole and the inner passage. In an open position, the passage couples the outer housing hole to the inner passage.

19 Claims, 4 Drawing Sheets

(51) Int. Cl.
*F16K 3/24* (2006.01)
*E21B 34/04* (2006.01)
*E21B 34/16* (2006.01)

(56) References Cited

U.S. PATENT DOCUMENTS

| | | | |
|---|---|---|---|
| 3,958,633 A * | 5/1976 | Britch | E21B 23/03 166/117.5 |
| 4,224,993 A * | 9/1980 | Huckaby | E21B 34/10 137/509 |
| 4,880,060 A | 11/1989 | Schwendemann et al. | |
| 5,040,606 A * | 8/1991 | Hopper | E21B 33/1294 166/319 |
| 5,193,615 A * | 3/1993 | Akkerman | E21B 23/03 166/117.5 |
| 5,564,675 A * | 10/1996 | Hill, Jr. | E21B 34/10 166/321 |
| 5,894,890 A | 4/1999 | Garcia-Soule et al. | |
| 6,619,388 B2 * | 9/2003 | Dietz | E21B 34/066 166/332.8 |
| 6,684,958 B2 * | 2/2004 | Williams | E21B 34/00 166/321 |
| 8,967,241 B2 * | 3/2015 | Xu | E21B 27/005 166/301 |
| 9,404,326 B2 * | 8/2016 | Zhou | E21B 21/003 |
| 10,156,124 B2 * | 12/2018 | Guzman | E21B 34/14 |
| 2007/0001134 A1 * | 1/2007 | Lonnes | E21B 21/10 251/63 |
| 2009/0078428 A1 * | 3/2009 | Ali | E21B 34/08 166/373 |
| 2011/0005770 A1 | 1/2011 | Scranton et al. | |
| 2011/0168410 A1 * | 7/2011 | deBoer | E21B 21/10 166/386 |
| 2011/0226482 A1 * | 9/2011 | Trewhella | E21B 17/06 166/340 |
| 2011/0308860 A1 * | 12/2011 | deBoer | E21B 17/00 175/57 |
| 2015/0308250 A1 * | 10/2015 | Anders | E21B 33/12 166/308.2 |
| 2017/0218710 A1 * | 8/2017 | Zhou | E21B 21/103 |

* cited by examiner

ANNULUS ACCESS VALVE

BACKGROUND

After a hydrocarbon well has been drilled, it may go through a completion process in which the borehole is cased and a production tree, also referred to in the art as a Christmas tree, is coupled to the borehole casing. The production tree and other parts of a production string may incorporate various valves that would be desirable to test. Such valves that are located in hazardous or inaccessible environments may be difficult to test.

DETAILED DESCRIPTION

Some of the challenges noted above, as well as others, can be addressed by the annulus access valve described herein. In various embodiments, operation of the annulus valve is controlled via an umbilical with fluid pressure from the surface, so that annulus pressure (e.g., pressure in the fluid that is present in the annulus) may be selectively applied against the valve under test.

Some strings and production trees may be located in harsh or inaccessible environments. For example, a borehole that is located in a seabed, may be have its opening thousands of feet below the surface. Thus, valves that are part of a production tree and/or undersea string coupled to such a borehole may be difficult or impossible to access for testing.

For example, a cut-off valve may be used in an undersea string such that, if a pipe to the surface shears off, the cut-off valve closes to prevent the escape of hydrocarbons from the broken string. Reliable operation of such a valve is important to test. Thus, pressure may be applied to the backside of the valve (i.e., opposite from the side facing the producing well) in order to test its ability to prevent a fluid from escaping. The annulus access valve can provide such testing as described herein.

Figure 1:
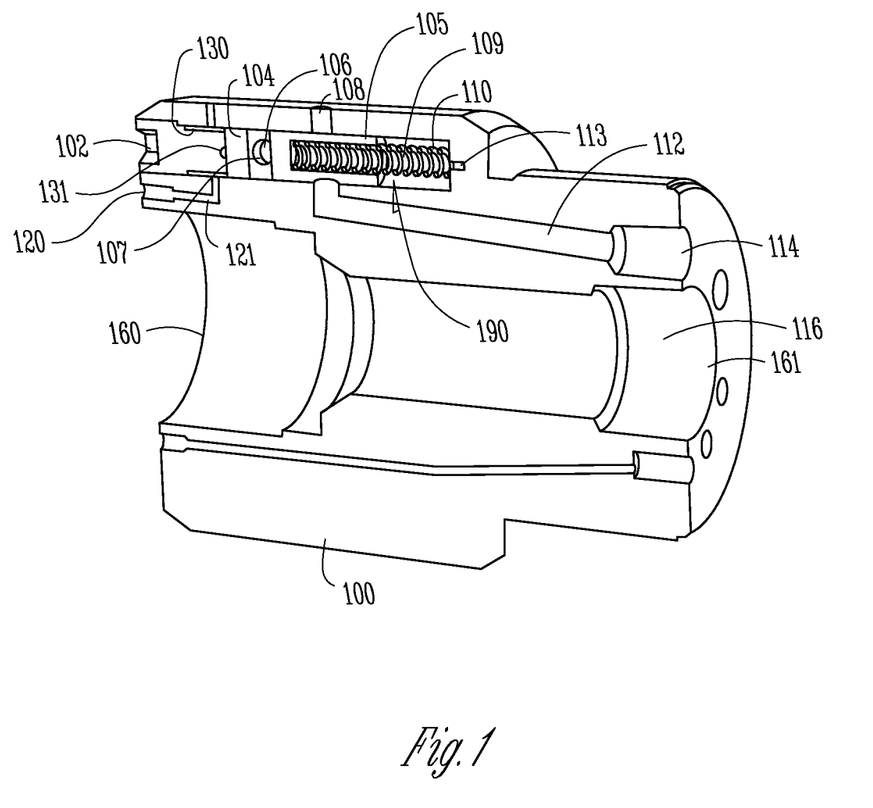
FIG. 1 is a cross-sectional diagram showing an annulus access valve, according to various examples of the disclosure.

FIG. 1 is a cross-sectional diagram showing an annulus access valve, according to various examples of the disclosure. The valve 190 may be included in a housing 100. The housing 100 of FIG. 1 is for purposes of illustration only as other housing configurations may be used. In one example, the housing may comprise a tubing hanger running tool adaptor as part of a lower landing string.

Figure 2:
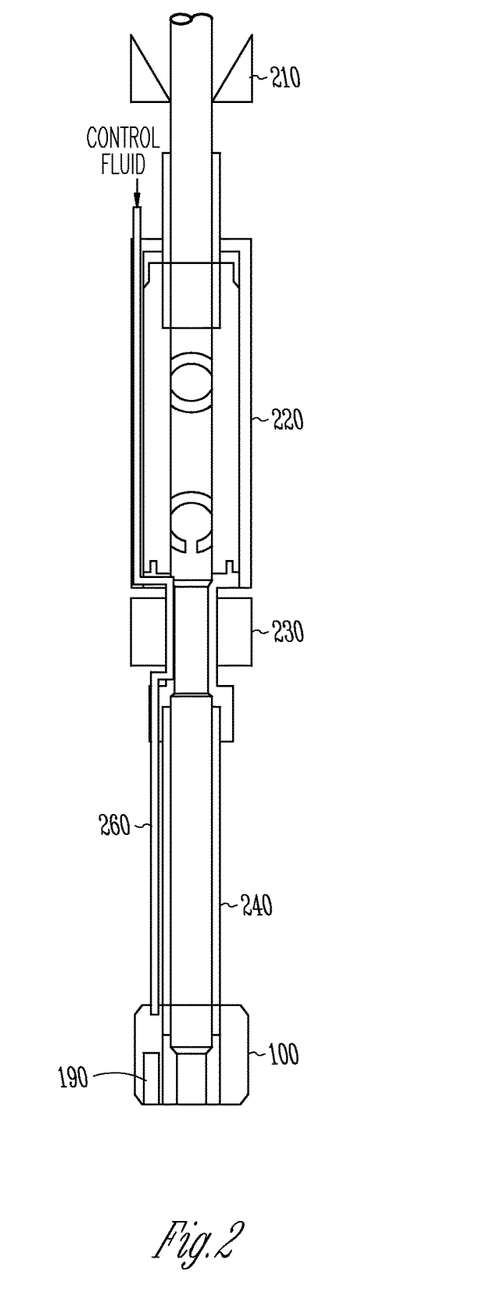
FIG. 2 is a cross-sectional diagram showing a string incorporating the annulus access valve, according to various examples of the disclosure.

The housing 100 includes a longitudinal opening 116 that may be coupled to a production string, as illustrated in FIG. 2. The longitudinal opening 116 allows a fluid (e.g., hydrocarbons) to traverse the length of the housing 100. The housing 100 also provides at least two coupling points 160, 161 on opposite ends of the longitudinal opening 116 in order to mount the housing 100 and, thus, the annulus access valve 190 to a string. For example, one coupling point 160 may be coupled to a first pipe while the second coupling point 161 may be coupled to a second pipe so that the housing 100 connects the two pipes.

The annulus access valve 190 comprises a chamber 110 in which a spring device 109 is mounted. For example, the spring device 109 may be mechanically coupled to one end 113 of the chamber 110. In an example, the chamber 110 comprises a cylindrical shape so that a sliding member 104 may slide within the chamber 109 in response to spring and fluid forces, as described subsequently.

The sliding member 104 is mechanically coupled to the other end of the spring device 109. For example, the spring device 109 may be mechanically coupled within a hollow lower portion 105 of the sliding member 104. The spring force provided by the spring device 109 pushes against both the housing connection point 113 and an upper portion of the sliding member 104, thus pushing the sliding member 104 away from the connection point 113 of the housing 100 and towards or even against a plug 102 that may be inserted into the housing.

The sliding member 104 includes at least one passage 106 formed through the sliding member 104. The passage 106 is configured to line up with an opening 108 in the housing when a fluid force, as described subsequently, pushes on the top of the sliding member 104 and moves the side surrounding the hollow portion 105 of the sliding member into the chamber 110. In an example, the sliding member 104 includes two passages 106, 107 that align with corresponding holes in the housing 100 when the sliding member 104 is forced to move to an open position.

The first passage 106 of the sliding member 104 corresponds with and fluidly connects the outer hole 108 in the housing 100 with an inner passage 112 in the housing. The second passage 107 of the sliding member 104 may be formed such that it is approximately perpendicular to the first passage 106. The second passage 107 corresponds with and connects two outer holes (not shown) in the housing 100 with the inner passage 112.

The inner passage 112 may be approximately perpendicular to the outer hole 108 such that the inner passage 112 fits within a wall of the housing 100. The inner passage 112 is also fluidly connected, internal to the housing 100, with an inner passage outlet 114 located at one end of the housing 100.

The plug 102 includes a bottom surface opposite a top surface of the sliding member 104. The bottom surface of the plug 102 may include an irregular surface area 131 (e.g., semicircular, scalloped area). This area 131 may reduce the occurrence of hydraulic lock when the relatively flat top surface of the sliding member 104 is directly opposite the bottom surface of the plug 102.

A control fluid port 120 may be located on one end of the housing 100. One end of the control fluid port 120 comprises an opening on the housing 100 that fluidly connects with a control fluid internal passage 121 within the housing 100. The internal passage 121 of the control fluid port 120 opens into the chamber 110 of the valve 190 adjacent to the top surface of the sliding member 104 and adjacent to a side of a lower portion of the plug 102. The internal passage 121 of the control fluid port 120 opens into a gap area 130 that substantially surrounds the lower portion of the plug 102. Thus, fluid injected into the control fluid port 120 may enter the control fluid internal passage 121 and be forced into the gap area 130 and an area between the bottom surface of the plug 102 and the top surface of the sliding member 104.

In another example, the plug 102 may not be used. For example, a portion of the housing 100 may be used in place of the plug 102 and provide a gap area 130 adjacent to the top surface of the sliding member 104.

In operation, the valve 190 includes both a closed position and an open position. The closed position does not provide pressure to the valve under test. The open position provides a transfer of fluid pressure to the valve under test.

In an example, the default state of the valve 190 is in the closed position. In this position, the spring is exerting a force on the sliding member 104 such that the sliding member 104 is pushed away from the bottom of the chamber 110. The side surrounding the hollow portion 105 of the sliding member 104 is in a position to block the outer hole 108 from being coupled to the inner passage 112.

When a control fluid is injected into the control fluid port 120, the control fluid is forced into the gap area 130 and between the bottom surface of the plug and the top surface of the sliding member 104. The force of the control fluid pushes against the force of the spring 109. When the control fluid force is greater than the spring force, the control fluid force pushes the sliding member 104 towards the bottom of the chamber 110. The one or more passages 106, 107 then align with the corresponding outer hole(s) 108. Fluid under pressure (e.g., from the annulus) may then enter the outer hole 108, be forced through the inner passage 112 and exit the apparatus through the inner passage outlet 114. Thus, the force of the fluid through the outer hole 108 may be used to test the valve coupled to the inner passage outlet 114. Once the control fluid force is released, the spring force pushes the sliding member 104 back to return to the default position, blocking the outer holes 108.

FIG. 2 is a cross-sectional diagram showing a string incorporating the annulus access valve 190, according to various examples of the disclosure. The string may comprise any one of a variety of types, such as a production string, drilling string, etc. However, it is subsequently described as a subsea string for purposes of illustrating one example use of the annulus access valve 190. The annulus access valve 190 may be used in other implementations.

The housing 100 that incorporates the annulus access valve 190 may be coupled, on an upper end (i.e., connect point 160 of FIG. 1), to a space spool 240. The space spool 240 may be coupled to a blowout preventer (BOP) 230. The BOP 230 may be coupled to a subsea safety tree 220 that, in turn, may be coupled to a shear joint 210. The other end of the housing 100 (e.g., connect point 161) may be further coupled to other portions of a production string, a Christmas tree, or other pipes.

A control fluid line 260 is coupled to the control fluid port 120 of the annulus access valve 190. The control fluid line 260 may extend to the surface in a subsea environment in order to enable a control device on the surface to inject a control fluid (e.g., water, drilling mud, hydrocarbons) into the control fluid line 260 and, thus, into the control fluid port 120 of the valve 190. The pressure from the control fluid may then be used to control operation of the valve 190 from a closed position to an open position.

Once the valve 190 is in the open position, fluid pressure from a fluid in the annulus surrounding the housing 100 may enter the outer hole 108 in the housing. The annulus around the housing 100 may be provided by another, concentric pipe (not shown for purposes of clarity) surrounding the housing 100. In another example, the annulus fluid pressure may simply be provided as part of the pressure that is available from the surrounding sea water at depth, without the concentric pipe.

Figure 3:
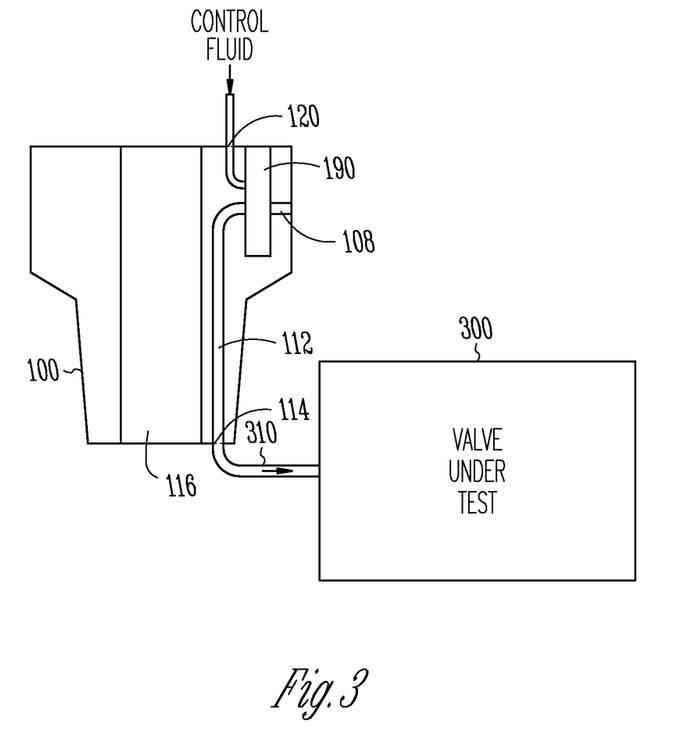
FIG. 3 is a cross-sectional diagram showing the annulus access valve as coupled to a valve under test, according to various examples of the disclosure.

FIG. 3 is a cross-sectional diagram showing the annulus access valve 190 as coupled to a valve under test 300, according to various examples of the disclosure. The valve under test 300 may be any valve that would be desirable to test for proper operation. In an example, the annular access valve 190 may be coupled to test the back side of a cut-off valve.

In the illustrated example, the valve under test 300 is coupled through a connection 310 (e.g., pipe, conduit) to the inner passage outlet 114 of the annulus access valve 190. Thus, as subsequently described in the method for operation, pressure transferred through the valve 190, from the annular area around the valve 190, may be applied to the valve under test (e.g., backside of a cut-off valve).

Figure 4:
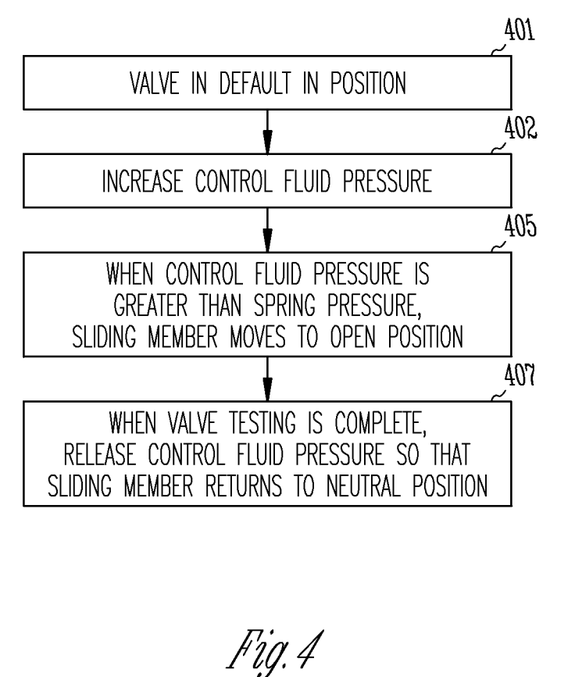
FIG. 4 is a flowchart of a method for operation of the annulus access valve, according to various examples of the disclosure.

FIG. 4 is a flowchart of a method for operation of the annulus access valve, according to various examples of the disclosure. The control of the annulus access valve 190 may be performed by the application of control fluid pressure from the surface, as shown in other examples, or by the application of control fluid from closer to the valve. In describing the operation of the annulus access valve 190, reference is made to both the flowchart of FIG. 4 and the apparatus diagram of FIG. 1.

The method begins with the sliding member 104 of the valve 190 in the default position, in block 401. In one example, this position is with the valve closed. In another embodiment, the default position may be with the valve open.

In block 402, a control fluid pressure is injected into the control fluid port 120 and through the control fluid passage 121 to the gap area 130 and area between the bottom surface of the plug 102 and top surface of the sliding member 104. In block 405, when the control fluid pressure is greater than the spring pressure, the sliding member 104 moves to the open position. The open position occurs when the sliding member 104 is forced away from the bottom surface of the plug 102 towards the bottom of the chamber 110. This enables the passages 106, 107 to align with external holes 108 and, thus, allow fluid pressure to enter the valve and be forced through the inner passage 112 to the valve under test.

In block 407, when valve testing has been completed, control fluid pressure is reduced to less than the spring force. The spring forces the sliding member 104 back, to return to the default position (e.g., closed in this example). The sliding member 104 moves back to its neutral position where the spring force equals or exceeds any control fluid force and covers the external hole(s) 108.

Various examples include:

Example 1 is a valve, comprising a housing comprising an outer hole, a control fluid port, and an inner passage outlet; a chamber within the housing; a sliding member to move within the chamber, the sliding member comprising a lower portion and an upper portion, the upper portion comprising at least one passage; a spring device having a first end mechanically coupled to one end of the chamber and a second end mechanically coupled to the lower portion of the sliding member; an inner passage fluidly coupled between the chamber and the inner passage outlet; and a control fluid inner passage fluidly coupled between the chamber and the control fluid port, the inner passage fluidly coupled to a gap area adjacent to a top surface of the sliding member; wherein, in a closed position, the lower portion of the sliding member is between the outer hole and the inner passage and, in an open position, the at least one passage fluidly couples the outer hole to the inner passage.

In Example 2, the subject matter of Example 1 further includes the lower portion of the sliding member comprising a hollow area.

In Example 3, the subject matter of Examples 1-2 further include that the spring device is disposed within the hollow lower portion.

In Example 4, the subject matter of Examples 1-3 further include that a plug disposed in the chamber at an end opposite to the end of the chamber is coupled to the spring device.

In Example 5, the subject matter of Examples 1-4 further include that the plug forms a gap area between the housing and the plug, the control fluid inner passage coupled to the chamber within the gap area.

In Example 6, the subject matter of Examples 1-5 further include that the plug comprises an irregular surface area on a bottom surface adjacent to the top surface of the sliding member.

In Example 7, the subject matter of Examples 1-6 further include that the upper portion of the sliding member comprises a plurality of passages, each of the passages to fluidly couple a corresponding hole in the housing with the inner passage coupled between the chamber and the inner passage outlet.

In Example 8, the subject matter of Examples 1-7 further include that the spring device is configured to provide a spring force to push the sliding member away from the end of the chamber coupled to the spring device.

In Example 9, the subject matter of Examples 1-8 further include that the housing comprises a tubing hanger running tool adaptor.

In Example 10, the subject matter of Examples 1-9 further include that the housing comprises a longitudinal opening that traverses the housing.

Example 11 is a method for operation of a valve, the method comprising providing a spring force to push a sliding member, in a chamber of a housing, into a closed position; injecting a control fluid into a control fluid port to increase a fluid pressure in a gap area adjacent to a top surface of the sliding member; and increasing the control fluid pressure to a force greater than the spring force to move the sliding member to an open position, the open position comprising a passage in an upper portion of the sliding member fluidly coupling an outer hole of the housing with an inner passage within the housing, wherein an annulus fluid pressure is enabled to traverse the housing from the outer hole to an outlet of the inner passage.

In Example 12, the subject matter of Example 11 further includes coupling a valve under test to the outlet of the inner passage wherein the annulus fluid pressure is applied to the valve under test when the sliding member is in the open position.

In Example 13, the subject matter of Examples 1-12 further include that the open position further comprises a plurality of passages coupling outer holes of the housing to the inner passage.

In Example 14, the subject matter of Examples 1-13 further include that increasing the control fluid pressure comprises injecting the control fluid into a gap area between a plug and the housing, the gap area adjacent to the top surface of the sliding member, such that the control fluid pressure is applied between the plug and the top surface of the sliding member.

In Example 15, the subject matter of Examples 1-14 further include that decreasing the control fluid pressure to less than the spring force such that the sliding member returns to the closed position wherein a lower portion of the sliding member blocks access of the outer hole to the inner passage.

Example 16 is a system, comprising: a string to convey hydrocarbons from a hydrocarbon borehole; and a tubing hanger running tool adaptor housing coupled to the subsea string, the tool adaptor housing comprising an annulus access valve, the valve comprising: a chamber within the tool adaptor housing; a sliding member to move within the chamber, the sliding member comprising a lower portion and an upper portion, the upper portion comprising a plurality of passages; a spring having a first end mechanically coupled to one end of the chamber and a second end mechanically coupled to the lower portion of the sliding member; an inner passage fluidly coupled between the chamber and an inner passage outlet in the tool adaptor housing; and a control fluid inner passage fluidly coupled between the chamber and the control fluid port in the tool adaptor housing, the inner passage fluidly coupled to a gap area adjacent to a top surface of the sliding member; wherein, in a closed position, the lower portion of the sliding member is between outer holes in the tool adaptor housing and the inner passage and, in an open position, each of the plurality of passages couples corresponding outer holes to the inner passage.

In Example 17, the subject matter of Example 16 further includes a cut-off valve coupled to the inner passage outlet.

In Example 18, the subject matter of Examples 16-17 further include that the annulus fluid pressure can be received at a backside of the cut-off valve when the annulus access valve is in the open position.

In Example 19, the subject matter of Examples 16-18 further include that the tool adaptor housing comprises a longitudinal opening coupling a lower pipe to an upper pipe.

In Example 20, the subject matter of Examples 16-19 further include that the plurality of passages in the upper portion of the sliding member are approximately perpendicular to each other.

The above description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The detailed description is, therefore, not to be taken in a limiting sense.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A valve, comprising:
   a housing comprising a longitudinal opening extending through the housing to enable a fluid flow therethrough, an outer hole fluidly coupled to an annulus outside the housing, a control fluid port through a first end of the housing, and an inner passage outlet through a second end of the housing;

a chamber within the housing;
a sliding member to move within the chamber, the sliding member comprising a lower portion and an upper portion, the upper portion comprising at least one passage;
a spring device having a first end mechanically coupled to one end of the chamber and a second end mechanically coupled to the lower portion of the sliding member;
an inner passage fluidly coupled between the chamber and the inner passage outlet;
a control fluid inner passage fluidly coupled between the chamber and the control fluid port, the inner passage fluidly coupled to a gap area adjacent to a top surface of the sliding member;
wherein, in a closed position, the lower portion of the sliding member is between the outer hole and the inner passage and, in an open position, the at least one passage fluidly couples the outer hole to the inner passage; and
wherein the outer hole, the control fluid port, the inner passage outlet, the chamber, the inner passage, and the control fluid inner passage are fluidly isolated from the longitudinal opening.

2. The valve of claim 1, wherein the lower portion of the sliding member comprises a hollow area.

3. The valve of claim 2, wherein the spring device is disposed within the hollow lower portion.

4. The valve of claim 1, further comprising a plug disposed in the chamber at an end opposite to the end of the chamber coupled to the spring device.

5. The valve of claim 4, wherein the plug forms a gap area between the housing and the plug, the control fluid inner passage coupled to the chamber within the gap area.

6. The valve of claim 4, wherein the plug comprises an irregular surface area on a bottom surface adjacent to the top surface of the sliding member.

7. The valve of claim 1, wherein the upper portion of the sliding member comprises a plurality of passages, each of the passages to fluidly couple a corresponding hole in the housing with the inner passage coupled between the chamber and the inner passage outlet.

8. The valve of claim 1, wherein the spring device is configured to provide a spring force to push the sliding member away from the end of the chamber coupled to the spring device.

9. The valve of claim 1, wherein the housing comprises a tubing hanger running tool adaptor.

10. A method for operation of a valve, the method comprising
providing a spring force to push a sliding member, in a chamber of a housing, into a closed position, the housing comprising a longitudinal opening extending through the housing to enable a fluid flow therethrough;
injecting a control fluid through a first end of the housing into a control fluid port to increase a control fluid pressure in a gap area adjacent to a top surface of the sliding member; and
increasing the control fluid pressure to a force greater than the spring force to move the sliding member to an open position, the open position comprising a passage in an upper portion of the sliding member fluidly coupling an outer hole of the housing with an inner passage within the housing, wherein an annulus fluid pressure is enabled to traverse the housing from the outer hole to an outlet of the inner passage in a second end of the housing, and wherein the chamber, the control fluid port, the inner passage, and the outlet of the inner passage are fluidly isolated from the longitudinal opening.

11. The method of claim 10, further comprising:
coupling a valve under test to the outlet of the inner passage wherein the annulus fluid pressure is applied to the valve under test when the sliding member is in the open position.

12. The method of claim 10, wherein the open position further comprises a plurality of passages coupling outer holes of the housing to the inner passage.

13. The method of claim 10, wherein increasing the control fluid pressure comprises injecting the control fluid into a gap area between a plug and the housing, the gap area adjacent to the top surface of the sliding member, such that the control fluid pressure is applied between the plug and the top surface of the sliding member.

14. The method of claim 10, further comprising decreasing the control fluid pressure to less than the spring force such that the sliding member returns to the closed position wherein a lower portion of the sliding member blocks access of the outer hole to the inner passage.

15. A system, comprising:
a string to convey hydrocarbons from a hydrocarbon borehole; and
a tubing hanger running tool adaptor housing coupled to the subsea string, the tool adaptor housing comprising a longitudinal opening extending through the housing to enable a fluid flow therethrough and an annulus access valve, the valve comprising:
a chamber within the tool adaptor housing;
a sliding member to move within the chamber, the sliding member comprising a lower portion and an upper portion, the upper portion comprising a plurality of passages;
a spring having a first end mechanically coupled to one end of the chamber and a second end mechanically coupled to the lower portion of the sliding member;
an inner passage fluidly coupled between the chamber and an inner passage outlet in a first end of the tool adaptor housing;
a control fluid inner passage fluidly coupled between the chamber and a control fluid port in a second end of the tool adaptor housing, the inner passage fluidly coupled to a gap area adjacent to a top surface of the sliding member;
wherein, in a closed position, the lower portion of the sliding member is between outer holes in the tool adaptor housing and the inner passage and, in an open position, each of the plurality of passages couples corresponding outer holes to the inner passage; and
wherein the control fluid port, the inner passage outlet, the chamber, the inner passage, and the control fluid inner passage are fluidly isolated from the longitudinal opening.

16. The system of claim 15, further comprising a cut-off valve coupled to the inner passage outlet.

17. The system of claim 16, wherein annulus fluid pressure can be received at a backside of the cut-off valve when the annulus access valve is in the open position.

18. The system of claim 15, wherein the tool adaptor housing comprises a longitudinal opening coupling a lower pipe to an upper pipe.

19. The system of claim 15, wherein the plurality of passages in the upper portion of the sliding member are approximately perpendicular to each other.

\* \* \* \* \*